March 30, 1965 G. D'ARCY BROWNE 3,176,074
TIME DIVISION MULTIPLEX STEREOPHONIC SOUND TRANSMISSION SYSTEM
Filed March 9, 1960 3 Sheets-Sheet 1

INVENTOR.
GEOFFREY D'ARCY BROWNE
BY
Frank R. Trifari
AGENT

INVENTOR.
GEOFFREY D'ARCY BROWNE
BY Frank R. Trifari
AGENT

INVENTOR.
GEOFFREY D'ARCY BROWNE
BY
Frank R. Trifari
AGENT 3,176,074

TIME DIVISION MULTIPLEX STEREOPHONIC SOUND TRANSMISSION SYSTEM

Geoffry D'Arcy Browne, Norwood, London, England, assignor to North American Philips Company, Inc., New York, N.Y., a corporation of Delaware Filed Mar. 9, 1960, Ser. No. 13,850
Claims priority, application Great Britain, Mar. 11, 1959, 8,407/59
8 Claims. (Cl. 179—15)

This invention relates to a system and to the transmitter and the receiver to be employed therein for the transmission of stereophonic signals. The transmitter is provided with two transmitting channels fed by the stereophonic signals A and B, the channels being released alternately by a gating voltage emanating from a gating-voltage generator supplying a sinusoidal voltage for transmitting the coherent, stereophonic signals A and B by pulse-amplitude modulation in time-interlaced periods; the receiver comprises two separate receiving channels connected to the output circuit of a time-interlacing device, which, in order to regain the coherent, stereophonic signals A and B releases alternately the separate receiving channels in the rhythm of the gating voltage.

The stereophonic transmission system according to the invention may be advantageously used for broadcasting, sound recording and reproduction by magnetic recording and reproducing systems, sound film and records.

The invention has for its primary object to provide, in a stereophonic transmission system, a synchronization between the transmitter and the receiver which is obtained by surprisingly simple means, while the power required for synchronization can be minimized substantially without being affected adversely by the signals to be transmitted.

The invention and its advantages will now be described more fully with reference to the figures which illustrate the manner in which the above primary object and further objects may be attained.

Figure 1A:
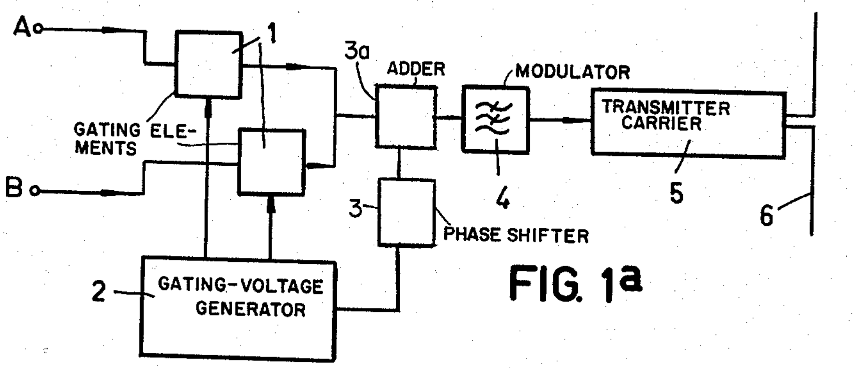

FIG. 1*a* shows a block diagram of a stereophonic transmission system at the transmitter end for broadcasting purposes.

Figure 1B:
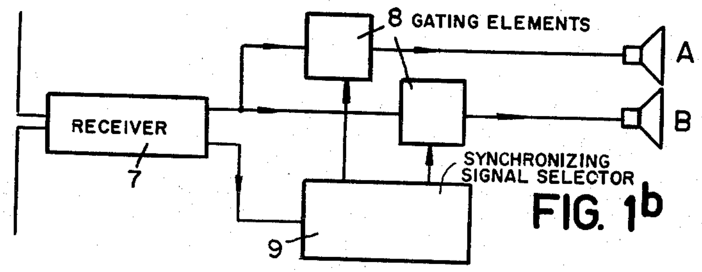

FIG. 1*b* shows a block diagram of a stereophonic transmission system at the receiver end for broadcast purposes according to the invention.

Figure 2:
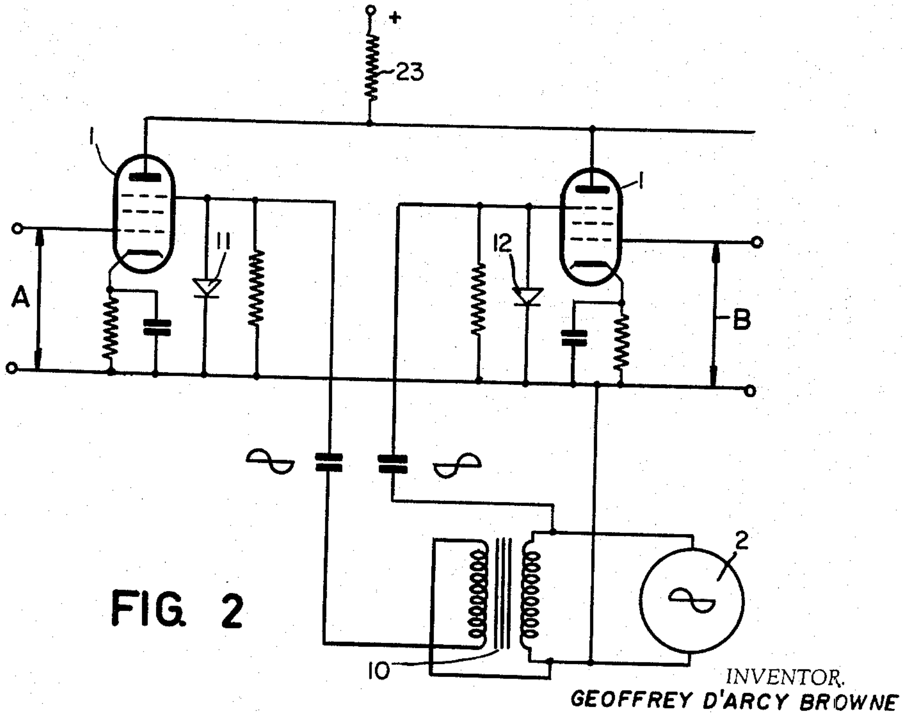

FIG. 2 shows a circuit arrangement to obtain the gating voltage from a sinusoidal voltage supplied by the gating-voltage generator.

Figure 3A:
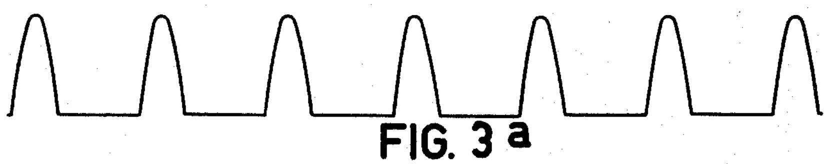
Figure 3B:
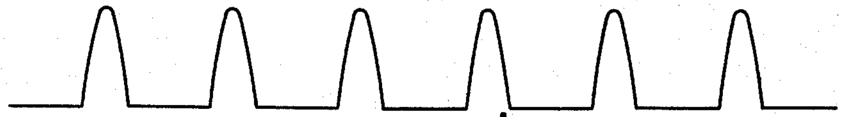

FIGS. 3*a* and 3*b* show the non-modulated gating voltage at the anodes of the gating tubes 1 of FIG. 2 for the channels A and B respectively.

Figure 3C:
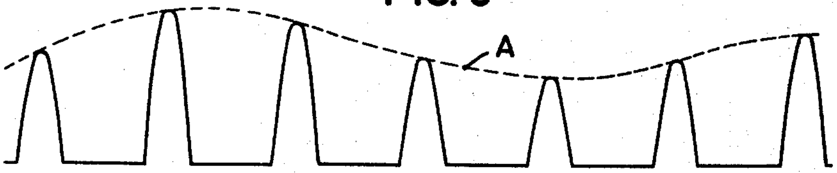
Figure 3D:
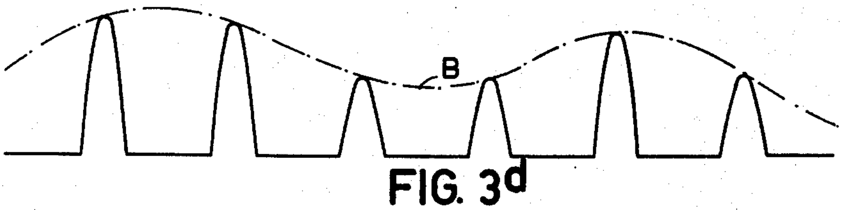

FIGS. 3*c* and 3*d* show the modulated gating voltage at the anodes of the gating tubes 5 and 5*a* of FIG. 2 for the channels A and B respectively.

FIG. 3*c* illustrates the sum of the modulated anode voltages of the gating valves 5 and 5*a*.

Figure 3E:
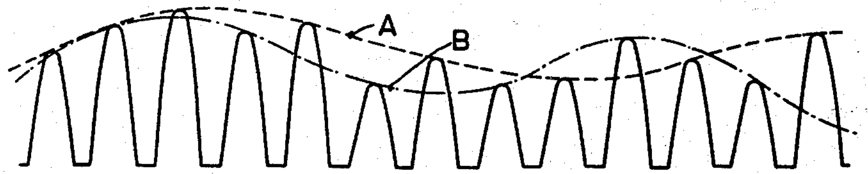
Figure 3F:
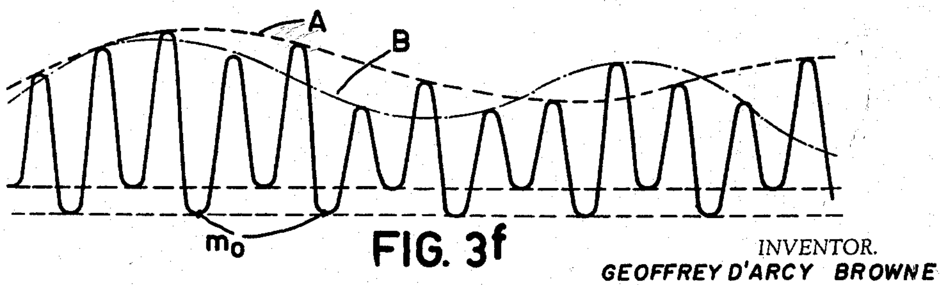

FIG. 3*f* illustrates the voltage of FIG. 3*e*, to which a substantially sinusoidal voltage of the same frequency, but with a phase shift of 90° is added.

Figure 4:
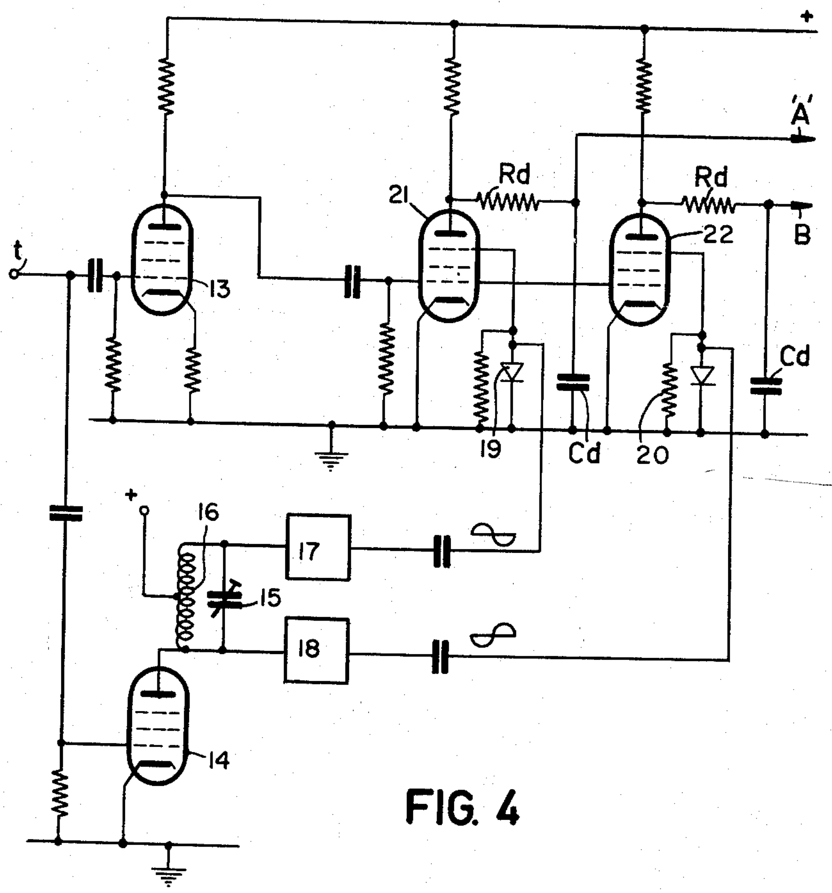

FIG. 4 shows a diagram of the synchronization signal selector, together with a time-interlacing device according to the invention.

As shown in FIG. 1*a* the two coherent, stereophonic signals A and B are fed each to a gating element 1, by means of which the signals are alternately released. These gating elements are controlled by two signals having a phase shift of 180°, emanating from a gating-voltage generator 2. In these gating elements the modulated gating voltages of FIGS. 3*c* and 3*d* are also added to form the voltage illustrated in FIG. 3*e*. The synchronizing signal consisting of part of the substantially sinusoidal voltage from the gating-voltage generator is subjected to a phase shift of 90° in a circuit 3 and is then added to the sum of the modulated gating voltages in an adder 3*a*; the resulting signal, which then has the waveform shown in FIG. 3*f*, is then modulated in a modulator 4 on the carrier of the transmitter 5 and fed to the aerial 6. It is evident that the modulation may be carried out by any of the known modulation methods.

In the receiver 7, shown diagrammatically in FIG. 1*b* the signal is fed, subsequent to detection, to two gating elements 8 of a time-interlacing device and a synchronizing-signal selector 9. These gating elements are gated by two gating voltages, having a phase shift of 180° and emanating from the synchronizing signal selector 9. This synchronizing signal selector 9 is constituted by the cascade connection of a threshold device and a resonant circuit tuned to the frequency of the synchronizing voltage; the output voltage of the synchronizing signal selector is fed, as a synchronizing signal, to the time-interlacing device.

As shown in FIG. 2 the sinusoidal voltage from the gating-voltage generator 2 is converted by means of the transformer 10 into two sinusoidal voltages, having a relative phase shift of 180°, each being fed via a threshold device formed by a diode 11, 12 to the collecting grid of a gating element 1, consisting of a pentode. By means of a Class C setting of these grids the angular aperture of the gating voltages becomes smaller than 180°, as is illustrated by the waveforms of FIGS. 3*a* and 3*b*. The two coherent, stereophonic signals A and B are fed each to the control-grid of the gating element 1, so that a low-frequency modulated gating voltage is obtained at the anode. By feeding the two gating tubes via a common anode resistor 23, the modulated gating voltages of the two channels A and B are added to each other, so that a signal as illustratted in FIG. 3*e* is formed.

Part of the sinusoidal voltage from the gating-voltage generator is passed through a network producing a phase shift of 90° and added by means of a known adding circuit to the signal of FIG. 3*e*, so that a signal as shown in FIG. 3*f* is obtained, which contains a negative-going sinusoidal synchronizing voltage. As can be seen from an examination of these waveforms, the effect of the addition of the synchronizing voltage is to displace the level of alternate minima of the waveform of FIG. 3*e*.

Owing to the 90° phase shift of the synchronizing signal with respect to the gating voltage it is ensured that the synchronizing voltage is substantially unaffected by the low-frequency modulation. The power required for synchronization is thus minimized.

At the receiver end the incoming signal is fed, subsequent to detection, to an arrangement as shown in FIG. 4 comprising the synchronizing signal selector and a time-interlacing device.

The signal of the waveform shown in FIG. 3*f* is fed to an amplifying tube 13 and to the tube 14, constructed as a threshold device, in which the synchronizing signal is separated from the incoming signal. The anode circuit of the tube 14 includes a resonant circuit tuned to the frequency of the synchronizing voltage, this circuit consisting of the parallel combination of a capacitor 15 and an inductor 16, which is connected via a center tap to the supply source.

If desired, a feed-back circuit may be connected between the anode circuit and the input circuit of the amplifying tube 14, so that this tube operates as a fly-wheel synchronization oscillator.

The two voltages having a phase shift of 180° at the ends of the tuned resonant circuit are fed each via a phase-shifting network 17 and 18 respectively, by which the correct phase of the gating voltage can be adjusted, and via a threshold device formed by a diode 19, 20, to the collecting grid of a gating tube 21 and 22 respectively, so that at the anode of this tube the modulated gating voltage of FIGS. 3*c* and 3*d* of the associated stereophonic signal A and B respectively is restored. These signals are fed each via a low-pass filter $R_dC_d$, which separates the gating voltage from the modulating low-frequency voltage, to the two channels of a low-frequency amplifier suitable for the reproduction of stereophonic signals. When frequency modulation is used for the high-frequency transmission, the filter $R_dC_d$ may advantageously be constructed in the form of a deemphasis filter.

While the invention has been described with respect to a specific embodiment, it is understood that various modifications thereof may be made by a person skilled in the art without departing from the inventive concept, the scope of which is set forth in the appended claims.

What is claimed is:

1. A system for the transmission of stereophonic signals including: a transmitter and at least one receiver, the transmitter comprising two transmitting channels fed by two coherent stereophonic signals A and B, gating elements in each of said transmitting channels, a gating-voltage generator supplying a sinusoidal voltage, means for applying a gating voltage to each of said gating elements, said gating voltages being derived from said sinusoidal voltage with a relative phase shift of 180 degrees, said gating elements operating to modulate the amplitude of said gating voltages with said stereophonic signals and to release said channels alternately in response to said gating voltages for the transmission of the coherent, stereophonic signals A and B by pulse amplitude modulation in time-interlaced periods, a receiver comprising two separate receiving channels connected to the output circuit of a time-interlacing device which alternately releases said separate receiving channels in synchronism with the alternate release of the transmitting channels, said transmitter including a 90 degree phase shifter, circuit means in said transmitter for applying said sinusoidal voltage to said 90 degree phase shifter and deriving therefrom a substantially sinusoidal synchronizing signal shifted in phase through about 90 degrees with respect to the gating voltage, circuit means for injecting said synchronizing signal into the pulse sequence to be transmitted, said receiver including a synchronizing signal selector to which the incoming signals are fed to restore the synchronizing signal, said selector comprising the cascade connection of a threshold device and a resonant circuit tuned to the frequency of the synchronizing voltage, and circuit means for feeding the output voltage of the synchronizing signal selector to said time-interlacing device.

2. A transmitting device for use in a system as claimed in claim 1, said device being provided with two transmitting channels fed by the coherent stereophonic signals A and B and released alternately by a gating voltage derived from a gating-voltage generator supplying a sinusoidal voltage for the transmission of the coherent stereophonic signals A and B by pulse amplitude modulation in time-interlaced periods, said device including means for deriving substantially sinusoidal synchronizing signal from the gating-voltage generator and injecting said synchronizing signal into the pulse sequence to be transmitted, said substantially sinusoidal synchronizing signal having a phase shift of substantially 90 degrees with respect to the gating voltage.

3. A transmitting device as claimed in claim 2, wherein the sinusoidal synchronizing signal from the gating-voltage generator is added, via a network producing a phase shift of 90 degrees, to the amplitude-modulated signal pulses, in a sum producer.

4. A transmitting device as claimed in claim 3, wherein means are provided for producing from the voltage derived from the gating-voltage generator two voltages having a phase shift of 180 degrees, which are each fed to a voltage limiter in order to obtain a gating voltage.

5. A receiver for use in a system as claimed in claim 1, said receiver comprising two separate receiving channels connected to the output circuit of a time-interlacing device, which device, in order to restore the coherent stereophonic signals A and B, releases alternately the separate receiving channels in the rhythm of the gating voltage, the incoming signals being fed to a synchronizing signal selector consisting of the cascade connection of a threshold device and a resonant circuit tuned to the frequency of the synchronizing voltage, the output voltage of the synchronizing signal selector being fed, as a gating signal, to the time-interlacing device.

6. A receiver as claimed in claim 5, wherein the threshold device is formed by a biased amplifying tube, the anode circuit of which includes a resonant circuit tuned to the synchronizing voltage.

7. A receiver as claimed in claim 6, wherein the tuned resonant circuit included in the anode circuit has a center tap connected to the voltage supply and the time-interlacing device is formed by a network producing a phase shift of 90 degrees, said network being connected to each of the circuit terminals and a voltage limiter connected thereto.

8. A system for transmitting and receiving two identifiable stereophonically related audio signals comprising: means for generating a time-interlaced pair of first gating waves, means for gating said two audio signals alternately with said first gating waves for a time period less than one-half cycle of each gating wave thereby obtaining a coded wave having minima at a substantially uniform level, means for modifying said coded wave by displacing the level of alternate minima with respect to the level of the remaining minima, thereby obtaining a complex waveform, means for transmitting the complex waveform thus obtained, means for receiving said complex waveform, means for separating said alternate minima, means for deriving from said separated minima a second pair of gating waves having substantially the same phase as said first pair of gating waves, means for supplying said second pair of gating waves to gating means, and means for supplying said complex signal to said gating means, said gating means reconstituting said audio signals.

References Cited by the Examiner

UNITED STATES PATENTS

| | | | |
|---|---|---|---|
| 2,262,764 | 11/41 | Hull | 179—15 |
| 2,352,634 | 7/44 | Hull | 179—15 |
| 2,725,470 | 11/55 | Houghton | 179—15 |
| 2,907,830 | 10/59 | Boutry et al. | 179—15 |
| 2,975,234 | 3/61 | Le Blan | 179—15 XR |
| 2,999,129 | 9/61 | Lynch | 179—15 |

DAVID G. REDINBAUGH, *Primary Examiner.*

ROBERT H. ROSE, STEPHEN W. CAPELLI, *Examiners.*